Patented Nov. 26, 1946

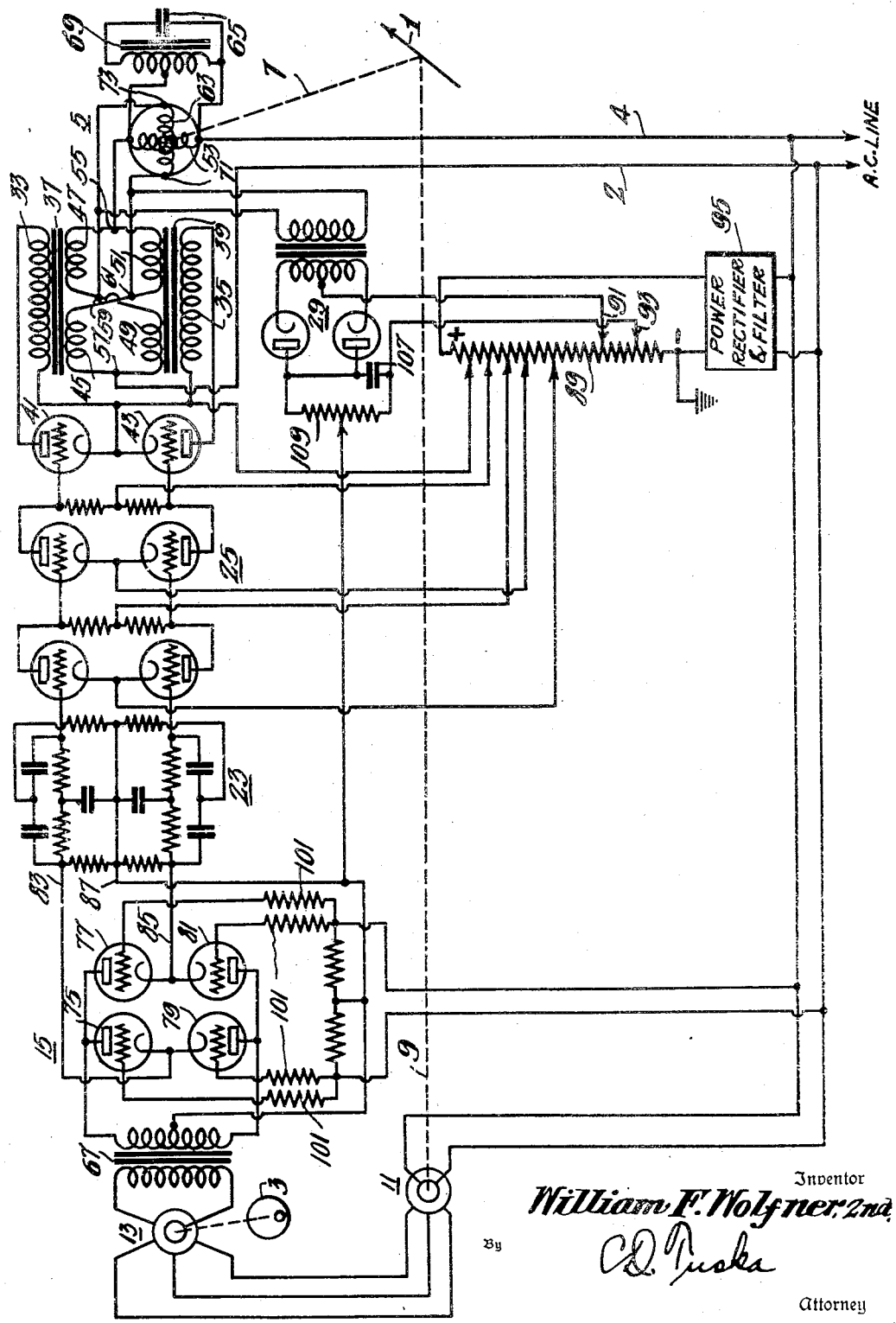

2,411,607

UNITED STATES PATENT OFFICE 2,411,607

REMOTE CONTROL SYSTEM

William F. Wolfner, II, Philadelphia, Pa., assignor to Radio Corporation of America, a corporation of Delaware Application July 31, 1942, Serial No. 452,984

8 Claims. (Cl. 172—239)

This invention relates to remote control systems and more particularly to electrical follow-up systems for driving a controlled device, for example a relatively heavy object such as a searchlight, a gun, or a radio antenna, to a position corresponding to that of a controlling device having relatively small torque capability, such as a hand operated controller or a sensitive instrument.

In this type of system, the control is accomplished by deriving a voltage, hereinafter referred to as a "displacement signal," related in magnitude to the difference in angular position between the controlling device and the controlled device and operating an electric motor in accordance with said voltage in such a way as to effect zero difference of positions. Numerous systems of this general type have been devised, and it has been found that it is usually necessary to provide more or less elaborate means to prevent over-running and reversal of the driving motor at the point of positional agreement, corresponding to zero control signal. This over-running and reversal may result in sustained oscillation of the driven member about a position corresponding to that of the control device. Such oscillation is called hunting. Similarly, the driven member will hunt during motion of the control device, increasing and decreasing in speed above and below that of the control device at a rate determined by the sensitivity of the system to angular differences in position, and the inertia and friction in the driven load. Hunting may be excited by the sudden application or removal of external force or resistance to motion on the driven load, or by sudden starting or stopping of the control device.

Accordingly, it is an object of this invention to provide an improved electrical follow-up system. Another object is to provide an improved method of and means for deriving and combining the electrical components of the motor control signal. A further object is the provision of improved means for utilizing said displacement signal to control the power input to an electric motor. Still another object is the provision of an improved method of and means for preventing hunting of an electrical follow-up system. Another object is to provide a follow-up system requiring only a relatively small amount of equipment comprised of readily obtainable components of standard design. A further object is to provide an improved method of and means for controlling the operation of an induction motor. These and other and incidental objects will become apparent to those skilled in the art upon consideration of the following description, with reference to the accompanying drawing, which is a schematic circuit diagram of an embodiment of the invention.

Referring to the drawing, a movable body 1 such as a gun, search light or radio antenna is designed to be oriented at an angle corresponding to a position of a control member such as a manually operable crank 3. The object 1 is connected to the rotor of a two phase induction motor 5 by mechanical means, which may include gearing, schematically indicated by the dotted line 7. The object 1 is also mechanically connected to the rotor of a Selsyn transformer 11 by means schematically indicated by a dotted line 9. The transformer 11 comprises a rotor having a single winding and three stator windings spaced 120 degrees apart. The stator windings of the transformer 11 are connected to corresponding stator windings of a similar transformer 13. The rotor of the transformer 13 is mechanically connected to the crank 3.

The induction motor 5 is energized from the A.-C. lines 2 and 4 through a control circuit comprising transformers 37 and 39 and vacuum tubes 41 and 43. The motor winding 53 is shunted by a condenser 65 through a transformer 69, in order to produce a quadrature phase relation between the currents through the windings 53 and 63. The transformer 69 is employed to step up the voltage across the condenser 65 so that a condenser of relatively small capacity may be used. The voltage ratio of the transformer 69 or the capacity of the condenser 65 is adjusted to produce exact quadrature relation between the currents when the motor is at a standstill. As the motor 5 speeds up, the impedance of the phase windings 53 and 63 change and currents through the windings do not remain in 90 degree phase relation. This causes the efficiency of the motor to decrease with increase in speed, allowing effective control over a wide range of speeds by merely varying the impedance connected between the motor and the line. The two windings are connected in series to prevent the motor from tending to operate single phase, which would cause instability because the motor would either stall or run at full speed.

The secondaries 45 and 47 of the transformer 37 and the secondaries 49 and 51 of the transformer 39 are connected to form a bridge circuit and the winding 63 of the motor 5 is connected across one pair of conjugate points 59 and 61 on the bridge circuit. Power is supplied to bridge at the other pair of conjugate points 55, 57 through the motor winding 55 from the line 2, 4. The primaries 33 and 35 are connected in the plate to cathode circuits of the tubes 41 and 43, respectively. The internal impedances of these tubes are reflected in the secondary windings 45 and 47 and 49 and 51, respectively. Thus, if the tube 41 is conducting and the tube 43 is cut off, the windings 45 and 47 offer low impedance to the flow of current while the windings 49 and 51 offer high impedance, and the terminal 71 of the winding 63 is effectively connected to the A.-C. line 2 while the terminal 73 is connected to the line 4 through the winding 53. If tube 43 is conducting and tube 41 is cut off, the connection to the winding 63 will be reversed. Thus, tubes 41 and 43 are means for simultaneously varying the impedances of the respective conjugate arms of the bridge circuit in opposite directions. The magnitude of the current flowing through the motor windings depends upon the degree to which either of the tubes 41 or 43 is conductive. Thus it is possible to regulate the speed and direction of rotation of the motor 5 by varying the grid voltages of the tubes 41 and 43.

One very important advantage in employing this type of control circuit lies in the fact that the power capability of the tubes 41 and 43 need only be a fraction of that of the motor 5. The maximum power dissipation in the control tubes occurs when half the line voltage is applied to the motor and half is absorbed in the control circuit. When nearly all the voltage is across the motor, the tube power dissipation is low, although the current is heavy, and the motor is fully loaded. When the motor power is low, the voltage across the control circuit is high, but very little current flows, so the power dissipated in the control circuit is again relatively low.

Control voltages for the tubes 41 and 43 are derived from the rotor of the Selsyn transformer 13 which is connected through a transformer 67 to a full wave grid controlled rectifier 15. The voltage applied to the transformer 67 is proportional in magnitude to the angular difference in position between the rotors of the transformers 11 and 13. Voltages from A.-C. line 2, 4 is applied to the rotor of the transformer 11 and also to the control grids of the rectifier tubes 75, 77, 79 and 81, through current limiting resistors 101. The output of the rectifier consists of unidirectional pulses which are conducted through the filter 23 to a D.-C. amplifier 25, thence to the control grids of the tubes 41 and 43. The rectifier output pulses will appear between the lead 87 and one or the other of the leads 83 and 85, depending upon whether the rotor of the transformer 13 leads or lags the rotor of the transformer 11, and the consequent polarity of the rotor of transformer 13 with respect to the line 2, 4. The average magnitude of the pulses will be proportional to the angular difference in position between the transformer rotors. The pulse polarity will be positive at lead 83 or 85, and negative at lead 87. Thus a voltage is applied to the control grid of either the tube 41 or the tube 43 causing the motor 5 to run at a speed proportional to the difference in position of the control member in the driven object and in the proper direction to reduce said differences to zero.

The system as thus far described would not be satisfactory in operation for the reason that the inertia of the driven object would cause the motor to overrun the position of zero control signal, reverse the signal and overrun in the opposite direction, resulting in sustained oscillations or hunting of the system. This can be prevented by reducing the control signal to zero before the motor reaches its final position: A voltage is added to the signal, applied to the D.-C. amplifier 25, in the proper polarity to oppose the displacement signal. This voltage is derived from a rectifier 29 which is connected across the winding 63 of the motor 5. The opposing voltage is thus proportional to the terminal voltage of the motor and is indirectly related to the motor speed and torque as well as to the control signal. Consider the motor 5 is an impedance Z, varying in magnitude inversely with respect to the torque, and the control circuit as a second impedance Z', varying in magnitude as a function of the control voltage. These two impedances are connected in series across a source of constant voltage E. The voltage appearing across the motor impedance Z is then equal to $$E\frac{Z}{Z+Z'}$$

and is therefore decreased upon increase of motor torque and increased upon decrease of the control impedance. The rectifier 29 is biased by a voltage taken from a potentiometer 89 across a direct current source 95 by means of taps 91 and 93 in the proper polarity to prevent rectification until a predetermined voltage is applied to the input of the rectifier.

Thus if the rotors of the transformer 11 and 13 are displaced relative to each other, the initial signal reaching the tube 41 or 43 is proportional to the displacement. However, as soon as the voltage across the motor winding 63 increases above a predetermined threshold value the rectifier 29 starts to conduct and the control signal is reduced by an amount dependent upon the terminal voltage of the motor. As the transformer rotors approach a position of agreement, the displacement signal derived from the rotor of transformer 13 is completely neutralized or balanced by the output of the rectifier 29 so that the energization of the motor 5 is reduced to zero before the driven object has reached its final position. If the threshold bias on the rectifier 29 is adjusted to the proper value, the motor 5 and its load will coast to the final position and stop without hunting.

If the system is operating with some particular value of control impedance and there is a momentary increase or decrease of the torque load, the feedback voltage is varied so as to increase or decrease the control signal and change the control impedance Z' to conform to the change in load.

Thus the invention has been described as an improved servo system. An A.-C. signal proportional to the angular displacement between the control and driven shafts is derived by means of Selsyn transformers. This signal is rectified and employed to control space discharge tubes connected to act as a control impedance between a driving motor and a power source. To prevent hunting, an auxiliary control signal is derived from the terminals of the driving motor, rectified, and applied through a threshold device to the control circuit, in opposition to the rectified displacement signal.

I claim as my invention:

1. A follow-up system including an input shaft, an output shaft, a load coupled to said output shaft, means responsive to the angular positions of said shafts to produce a displacement signal voltage having a magnitude proportional to the difference of said angular positions, a motor coupled to said output shaft and connected to a source of electrical energy through variable impedance means, means for controlling the impedance of said variable impedance means in response to control signal voltage applied thereto, rectifier means with an input circuit connected to a power input circuit of said motor and an output circuit connected to said position-responsive means to add the output of said rectifier means to said displacement signal voltage to produce a control signal voltage, means for applying said control signal voltage to said variable impedance controlling means, and means for applying a theshold bias to said rectifier means to prevent operation thereof except when the input to said rectifier means has a magnitude greater than a finite value predetermined in accordance with the frictional and inertia characteristics of said motor and said load.

2. In an electrical follow-up system including an electric motor and amplifier means for energizing said motor in response to control signals applied thereto, rectifier means with an input circuit connected to a power input winding of said motor, a source of bias potential connected to said rectifier means to establish a threshold of operation thereof, and means for applying the output of said rectifier means to the input circuit of said amplifier means in opposition to said control signals.

3. In an anti-hunting feedback circuit for electrical follow-up systems, amplifier means, means for deriving a feedback voltage to be applied to the input circuit of said amplifier means, and means for applying said voltage to said input circuit, including unidirectionally conductive means, a source of bias potential, and means for applying voltage from said source to said unidirectionally conductive means to establish a threshold of operation thereof, whereby said feedback circuit operates only when said feedback voltage exceeds a predetermined finite value.

4. The invention as set forth in claim 1 wherein said variable impedance means comprises a pair of electron discharge tubes, transformers having primary windings connected in the anode-to-cathode circuits of said tubes, each of said transformers including two secondary windings, all of said secondary windings being connected together to form a bridge circuit, connections between one conjugate pair of terminals of said bridge circuit and one input winding of said motor, and connections from another conjugate pair of terminals of said bridge circuit to another input circuit of said motor and to said source of electrical energy, whereby said motor input windings are effectively connected in series to said source through said variable impedance means.

5. An electrical follow-up system including an input shaft, an output shaft, a load coupled to said output shaft, means responsive to the relative angular positions of said shafts to produce a pulsating voltage in one of two circuits, depending upon which of said shafts lags the other, of a magnitude corresponding to the extent of said lag, filter means connected to said circuits, D.-C. amplifier means connected to said filter means, variable impedance means connected to be controlled by the outputs of said amplifier means, an electric motor coupled to said output shaft and connected to a source of electrical energy through said variable impedance means, rectifier means with an input circuit connected to an input circuit of said motor and an output circuit connected to the input circuits of said filter means, and a source of bias potential connected to said rectifier means to establish a threshold of operation thereof.

6. The invention as set forth in claim 5 wherein said variable impedance means comprises a pair of electron discharge tubes, transformers having primary windings connected in the anode-to-cathode circuits of said tubes, each of said transformers including two secondary windings, all of said secondary windings being connected together to form a bridge circuit, connections between one conjugate pair of terminals of said bridge circuit and one input winding of said motor, and connections from another conjugate pair of terminals of said bridge circuit to another input circuit of said motor and to said source of electrical energy, whereby said motor input windings are effectively connected in series to said source through said variable impedance means.

7. A motor control system including a normally balanced bridge circuit having a pair of output terminals, a motor having two power input windings and terminal connections to a source of alternating energy for said motor, one of said windings being connected in series between said terminal connections and said bridge circuit and the other of said windings being connected across said output terminals, and electron discharge means for simultaneously varying the impedances of respective conjugate arms of said bridge circuit in opposite directions.

8. A motor control system including a motor having two power input windings and terminal connections to a source of alternating energy for said motor, a pair of electron discharge devices, means including a pair of transformers each having a primary winding and a pair of secondary windings, said secondary windings being connected in a bridge circuit having a pair of output terminals, one of said power input windings being connected in series with said bridge circuit and the other of said power input windings being connected across said output terminals and means for simultaneously varying the impedances of said electron discharge devices respectively in opposite directions.

WILLIAM F. WOLFNER, II.